No. 877,489. PATENTED JAN. 28, 1908.
W. H. CORBETT.
FRICTION CLUTCH.
APPLICATION FILED MAR. 9, 1907.
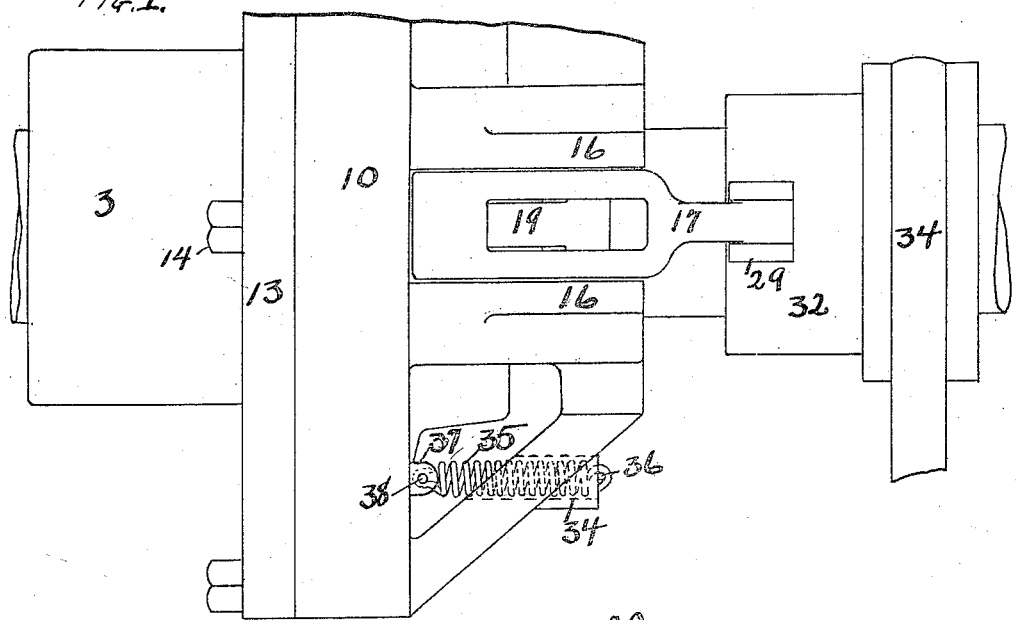
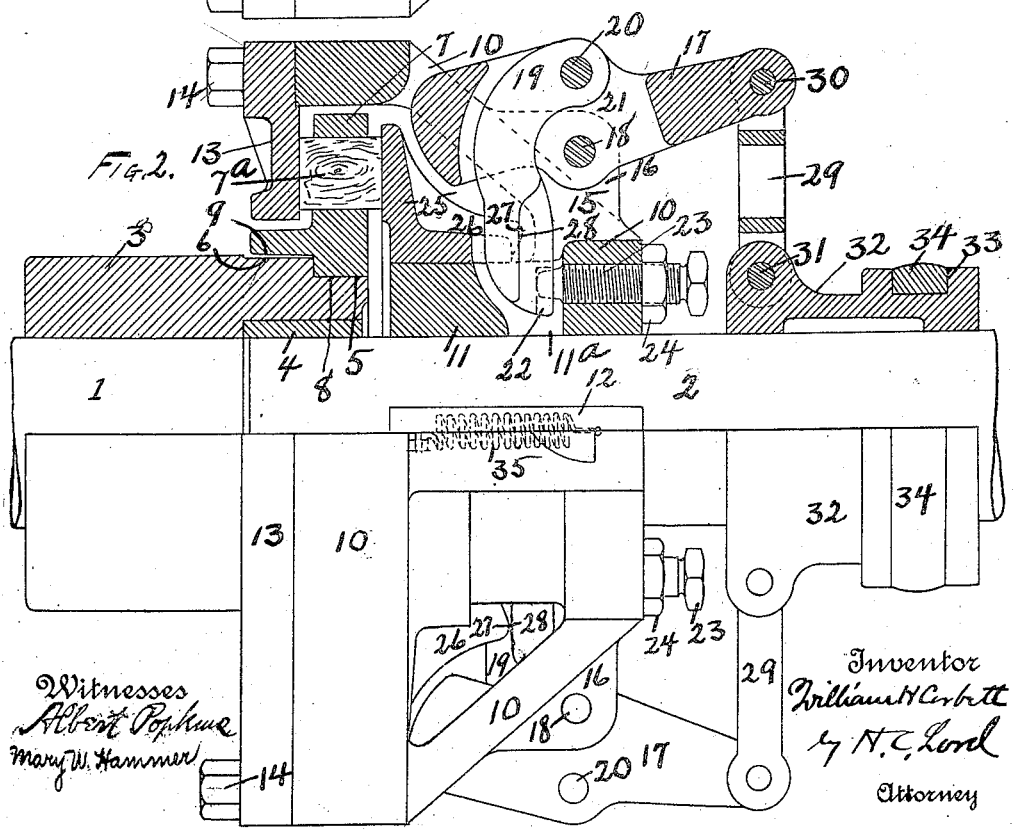

UNITED STATES PATENT OFFICE.

WILLIAM HARRISON CORBETT, OF PORTLAND, OREGON.

FRICTION-CLUTCH.

No. 877,489.  Specification of Letters Patent.  Patented Jan. 28, 1908.

Application filed March 9, 1907. Serial No. 361,498.

*To all whom it may concern:*

Be it known that I, WILLIAM HARRISON CORBETT, a citizen of the United States, residing at Portland, in the county of Multnomah and State of Oregon, have invented new and useful Improvements in Friction-Clutches, of which the following is a specification.

This invention relates to friction clutches and consists in certain improvements in the construction thereof as will be hereinafter fully described and pointed out in the claims.

The invention is illustrated in the accompanying drawings as follows:

Figure 1 shows a plan view of the clutch. Fig. 2, a side elevation partly in section.

1 marks the driving shaft; 2 the driven shaft. The sleeve 3 is fixed on the shaft 1 by any desirable means (not shown). A bearing ring 4 is arranged in the front end of the sleeve 3 and is journaled on the driven shaft 2. The sleeve 3 has an annular surface 5 immediately back of which is a shoulder 6 having a polygonal shape in cross section. The driving flange 7 has the central opening 8 which is arranged to make a sliding fit on the shoulder 6, and a polygonal socket 9 which engages the polygonal shoulder 6 so as to prevent rotative motion of the flange 7. The flange 7 has preferably a series of friction blocks 7ª.

The web 10 having the internal hub 11 is fixed on the shaft 2 by means of a key 12. The web 10 extends over the flange 7 and has secured to it a friction plate 13 by means of screws 14. The web has the opening 15 through it, and adjacent to the sides of the opening are the ears or lugs 16. The primary lever 17 is pivoted between these ears 16 on a pin 18 extending through the ears and the lever. The secondary lever 19 is pivoted on the pin 20 extending through the lever 19 and the lever 17, a slot 21 in the lever 17 permitting of hanging said lever 19 within the lever 17. The lever 19 extends downwardly and is provided with a slot 22 in the face of its lower end. A screw 23 extends into this slot, forming a fulcrum for the lever 19. The screw is mounted in the hub 11 and may be locked in adjustment by a nut 24. The end of the lever 19 extends into an opening 11ª in the hub 11. A friction plate 25 is slidingly mounted on the hub 11 and is preferably locked against rotation by any desirable means (not shown). It has the webs 26 which extend into contact with the shoulder 27 on the lever 19 so that when the lever 19 is swung toward the left, the lever acting on the pin 23 as a fulcrum, it moves the plate 25 into contact with the friction block 7ª, the flange 7 being slidingly mounted, but locked against rotation and is in turn forced into contact with the friction plate 13, and the clutch is thus set.

Any desirable mechanism may be used for operating the primary lever 17. I prefer, however, the toggle lever mechanism shown. The links 29 are pivoted by means of the pin 30 on the lever 17 and by means of the pin 31 on the sliding sleeve 32. The sliding sleeve 32 has the groove 33 in which is arranged the ring 34. Any desirable operating lever may be attached to the ring 34. In order to move the parts out of contact when the clutch is released, I provide a spring 35. This spring extends through a socket 34 in the web 10 and is secured by a pin 36 at the outer end of the socket. The opposite end of the spring is secured by a pin 38 between the ears 37 on the sliding plate 25. The spring tends to move the slide at all times out of contact so that when the plate is relieved from pressure by means of the lever the springs immediately throw it back out of contact.

What I claim as new is:

1. In a friction clutch the combination with a friction flange 7; and a web 10 extending around the periphery of the flange 7, and having the internal hub 11 projecting toward the flange 7 within the web; the friction plate 13 secured to said web; and engaging the surface of the flange 7 the more remote from the hub 11; the friction plate 25 slidingly mounted on the internal hub 11 and engaging the surface of the flange 7 adjacent to the hub 11; and means for actuating the friction plate 25.

2. In a friction clutch the combination with a friction flange 7; of a web 10 extending around the periphery of the flange 7, and having the internal hub 11 projecting toward the flange 7 within the web; the friction plate 13 secured to said web, and engaging the surface of the flange 7; the friction plate 25 slidingly mounted on the internal hub 11 and engaging the surface of the flange 7 adjacent to the hub 11; the lever 19 fulcrumed against the hub 11 and operating against the sliding plate 25; and means for actuating the lever 19.

3. In a friction clutch the combination with a friction flange 7; of a web extending around the periphery of the flange 7 and having the internal hub 11 projecting toward the flange 7 within the web; the friction plate 13 secured to said web, and engaging the surface of the flange 7 the more remote from the hub 11; the friction plate 25 slidingly mounted on the internal hub 11 and engaging the surface of the flange 7 adjacent to the hub 11; the secondary lever 19 fulcrumed against the hub 11 and operating against the sliding plate 25; the primary lever on which the lever 19 is pivoted, journaled on the web 10 and acting on the lever 19; and means for actuating the primary lever 17.

4. In a friction clutch the combination with a friction flange 7; of a web 10 having the internal hub 11; the friction plate 13 secured to said web; the friction plate 25 slidingly mounted on the internal hub 11; the secondary lever 19 fulcrumed against the hub 11 and operating against the sliding plate 25; the primary lever 17 on which the lever 19 is pivoted journaled on the web 10 and acting on the lever 19; and the toggle lever mechanism comprising the link 29 and sliding sleeve 32 for actuating the primary lever.

5. In a friction clutch the combination with a friction flange 7; of a web 10 having the internal hub 11; the friction plate 13 secured to said web; the friction plate 25 slidingly mounted on the internal hub 11; the lever 19 fulcrumed against the hub 11 and operating against the sliding plate 25; means for actuating the lever 19; and the adjusting screw 23 on the hub 11 forming a means of adjustment for the fulcrum of the lever 19.

6. In a friction clutch the combination of the friction flange 7; the shaft 2; the web 10 extending around the periphery of the flange 7 and having the internal hub 11 fixed against axial and rotative movement on the shaft 2 and projecting toward the flange 7 within the web; the friction flange 13 secured to the web 10 and engaging the surface of the flange 7 the more remote from the hub 11; the friction plate 25 slidingly mounted on the hub 11 within the web 10 and engaging the surface of the flange 7 adjacent to the hub 11; and a lever mechanism fulcrumed on the hub 11 for actuating the friction plate 25.

7. In a friction clutch the combination of the friction plate 7; the web 10 having the internal hub 11; the friction plate 13 secured to the web 10; the friction plate 25 slidingly mounted on the hub 11 and arranged within the web 10; the primary lever 17 pivotally mounted on the web 10 and having the slot 21 therein; the lever 19 pivotally mounted within the slot 21 and fulcrumed against the hub 11 and operating against the sliding plate 25; and means for actuating the primary lever.

8. In a friction clutch the combination of the sleeve 3; the friction flange 7 slidingly mounted on the sleeve but locked against rotation thereon; the shaft 2; the web 10 fixed against rotative and axial movement on the shaft 2 and having the internal hub 11; the friction plate 13 secured to the web 10; the plate 25 slidingly mounted on the hub 11; and means for actuating the plate 25 for moving it into engagement with the flange 7 and moving the flange 7 into engagement with the plate 13.

9. In a friction clutch the combination of the flange 7; the web 10 extending around the periphery of the flange 7 and having the internal hub 11 projecting toward the flange 7 within the web 10; the friction plate 13 secured to the web 10 and engaging the surface of the flange 7 the more remote from the hub 11; the friction plate 25 slidingly mounted on the hub 11 and engaging the surface of the flange 7 adjacent to said hub 11; lever mechanism for actuating the sliding plate 25; and a spring opposed to the lever mechanism and tending to move the plate 25 out of contact with the flange 7 when the clutch is released.

In testimony whereof I have hereunto set my hand in the presence of two subscribing witnesses.

WILLIAM HARRISON CORBETT.

Witnesses:
  C. E. GULLE,
  R. E. DAVIS.